(12) United States Patent
Hruby et al.

(10) Patent No.: US 11,187,127 B2
(45) Date of Patent: Nov. 30, 2021

(54) EXHAUST GAS TREATMENT SYSTEM AND METHOD WITH FOUR-WAY CATALYZED FILTER ELEMENT

(71) Applicant: Deere & Company, Moline, IL (US)

(72) Inventors: Eric J. Hruby, Waterloo, IA (US); Ayyappan Ponnaiyan, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/456,740

(22) Filed: Jun. 28, 2019

(65) Prior Publication Data

US 2020/0408121 A1    Dec. 31, 2020

(51) Int. Cl.

| | |
|---|---|
| *F01N 3/20* | (2006.01) |
| *F01N 1/08* | (2006.01) |
| *F01N 3/029* | (2006.01) |
| *B01D 53/94* | (2006.01) |
| *F01N 13/00* | (2010.01) |

(52) U.S. Cl.
CPC ............ *F01N 3/208* (2013.01); *F01N 1/082* (2013.01); *F01N 3/0293* (2013.01); *F01N 3/2066* (2013.01); *B01D 53/9459* (2013.01); *F01N 13/009* (2014.06); *F01N 2250/02* (2013.01); *F01N 2260/04* (2013.01); (Continued)

(58) Field of Classification Search
CPC .. F01N 3/2066; F01N 3/208; F01N 2510/068; F01N 2510/0682; F01N 2610/02
See application file for complete search history.

(56) References Cited

U.S. PATENT DOCUMENTS 6,753,294 B1   6/2004  Brisley et al.
8,557,204 B2  10/2013  Nunan et al.
(Continued)

FOREIGN PATENT DOCUMENTS

EP         2426326 A1    3/2012
WO    WO2017034463 A1    3/2017

OTHER PUBLICATIONS

European Search Report issued in counterpart application No. 20181950.5 dated Nov. 9, 2020 (07 pages).

*Primary Examiner* — Jonathan R Matthias
(74) *Attorney, Agent, or Firm* — Michael Best & Friedrich LLP

(57) ABSTRACT

An exhaust gas treatment system for an internal combustion engine includes an exhaust gas pathway configured to receive exhaust gas from the internal combustion engine, a first injector configured to selectively introduce a first reductant into the exhaust gas pathway in response to a sensed temperature of the exhaust gas being within a predetermined temperature range, and a first treatment element positioned within the exhaust gas pathway downstream of the first injector. The first treatment element includes a selective catalytic reduction (SCR) layer, a porous filter substrate, and a precious metal catalyst layer. The system also includes a second injector configured to introduce a second reductant into the exhaust gas pathway downstream of the first treatment element and a second treatment element positioned within the exhaust gas pathway downstream of the second injector. The second treatment element includes a SCR element.

19 Claims, 5 Drawing Sheets

(52) U.S. Cl.
CPC ...... *F01N 2610/02* (2013.01); *F01N 2610/03* (2013.01); *F01N 2900/1404* (2013.01)

(56) References Cited

U.S. PATENT DOCUMENTS

| | | |
|---|---|---|
| 8,722,000 B2 | 5/2014 | Boorse |
| 2009/0151340 A1 | 6/2009 | Kato |
| 2010/0064662 A1* | 3/2010 | Hinz ................. F01N 3/035 |
| | | 60/274 |
| 2010/0175372 A1 | 7/2010 | Lambert et al. |
| 2014/0271429 A1* | 9/2014 | Kazi ................. B01J 35/0006 |
| | | 423/213.5 |
| 2015/0247437 A1* | 9/2015 | Ancimer ............ F01N 3/2033 |
| | | 423/212 |
| 2015/0275730 A1* | 10/2015 | Gupta ............... F01N 13/0093 |
| | | 60/274 |
| 2016/0193597 A1 | 7/2016 | Wolff et al. |
| 2017/0130628 A1* | 5/2017 | Franz ................ F01N 3/2882 |
| 2017/0204762 A1 | 7/2017 | Kotrba et al. |
| 2017/0296969 A1 | 10/2017 | Ohashi et al. |
| 2018/0080357 A1* | 3/2018 | Jung ................. F01N 3/0871 |
| 2018/0087426 A1 | 3/2018 | Dou et al. |
| 2018/0111088 A1* | 4/2018 | Li ..................... B01J 37/0244 |
| 2018/0111089 A1 | 4/2018 | Li et al. |
| 2018/0135482 A1* | 5/2018 | Bailey .............. F01N 3/0842 |
| 2018/0353905 A1* | 12/2018 | Li ..................... B01J 23/44 |
| 2019/0001268 A1* | 1/2019 | Chen ................. B01J 37/0244 |
| 2019/0153921 A1* | 5/2019 | Gerlach ............. F01N 3/0814 |
| 2020/0224576 A1* | 7/2020 | Dou .................. F01N 3/2066 |
| 2020/0230582 A1* | 7/2020 | Patchett ............ B01D 53/9481 |

\* cited by examiner

EXHAUST GAS TREATMENT SYSTEM AND METHOD WITH FOUR-WAY CATALYZED FILTER ELEMENT

BACKGROUND

The present disclosure relates to exhaust systems and more particularly to diesel exhaust gas treatment systems.

Diesel exhaust is subject to emissions regulations covering a variety of emission components, including particulate matter and nitrogen oxides (NOx). A variety of exhaust treatment devices have been developed to reduce these emission components. For example, a selective catalytic reduction (SCR) element can be used to convert the NOx present in exhaust gas into other compounds, such as nitrogen, water, and carbon dioxide.

Typically, diesel exhaust fluid (DEF)—a solution of urea and deionized water—is injected upstream of the SCR element to provide ammonia, which acts as a reducing agent and reacts with the NOx in the presence of the SCR catalyst in accordance with Equation (1):

$$NO+NO_2+2NH_3 \rightarrow 2N_2+3H_2O \quad (1)$$

The NOx and ammonia are thus converted into nitrogen and water. As evident from Equation (1), the optimal stoichiometric ratio for this reaction includes equal parts of nitric oxide (NO) and nitrogen dioxide ($NO_2$).

Particulate matter is another component of diesel exhaust emissions being targeted with increasingly stringent regulations. A diesel particulate filter (DPF) can be used to trap diesel particulate matter. During operation, trapped soot on the filter element can be oxidized through a process referred to as passive regeneration. In particular, during passive regeneration, the carbon-based soot reacts with $NO_2$ in accordance with Equation (2) and Equation (3):

$$C+2NO_2 \rightarrow CO_2+2NO \quad (2)$$

$$C+NO_2 \rightarrow CO+NO \quad (3)$$

As evident from Equations (2) and (3), $NO_2$ also plays an important role in soot oxidation.

To provide enough $NO_2$ for NOx reduction and soot oxidation, some emissions systems include a diesel oxidation catalyst (DOC) upstream of a SCR and a DPF element. The DOC includes one or more precious group metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions and enhances passive regeneration.

At low temperatures (e.g., about 200 degrees Celsius or less) that occur during a cold start state of the engine or during very cold ambient operating conditions, the DOC may consume $NO_2$ by reacting $NO_2$ with carbon monoxide and hydrocarbons in the exhaust gas. This reduces the efficacy of downstream SCR elements, which require the presence of $NO_2$. The DOC also adds thermal mass to the exhaust gas treatment system, which delays warm-up of the downstream SCR elements.

In typical exhaust treatment systems with a DPF, passive regeneration alone may not be sufficient to manage soot accumulation on the filter element. Accordingly, such systems may periodically employ active regeneration. During active regeneration, a temperature of the exhaust gas at the DPF is increased to a target elevated temperature, typically at least 600 degrees Celsius, and maintained at the elevated temperature for a predetermined time period (e.g., 30 minutes). At high temperatures, carbon-based soot reacts with oxygen in accordance with Equation (4) and Equation (5):

$$C+O_2 \rightarrow CO_2 \quad (4)$$

$$2C+O_2 \rightarrow 2CO \quad (5)$$

The reactions of Equations (4) and (5) during active regeneration will thus restore the DPF to a clean state.

Raising the temperature of the exhaust gas during active regeneration requires using additional fuel, which is oxidized in the DOC. This increases $CO_2$ emissions. In addition, because the DPF is positioned downstream of the DOC, the temperature of the exhaust gas must be even higher in the DOC to achieve sufficiently high temperatures in the DPF for active regeneration to occur. The high temperatures increase insulation requirements, adding size, weight, and cost to the exhaust treatment system.

SUMMARY

Low temperature NOx reduction and $CO_2$ emissions are increasingly important considerations as emissions regulations become more stringent. Accordingly, a need exists for an exhaust gas treatment system able to more effectively reduce NOx and other emission components from exhaust gas.

In one aspect, the present disclosure provides an exhaust gas treatment system for an internal combustion engine with an exhaust gas pathway configured to receive exhaust gas from the internal combustion engine and a first treatment element positioned within the exhaust gas pathway. The first treatment element includes an inlet channel with a selective catalytic reduction (SCR) washcoat, an outlet channel, and a porous filter wall separating the inlet channel and the outlet channel such that the exhaust gas is configured to flow from the inlet channel to the outlet channel through the porous filter wall. The porous filter wall includes a precious metal catalyst layer. A first injector is configured to introduce a first reductant into the exhaust gas pathway upstream of the first treatment element, and a second injector is configured to introduce a second reductant into the exhaust gas pathway downstream of the first treatment element. The system further includes a second treatment element positioned within the exhaust gas pathway downstream of the second injector. The second treatment element includes a SCR element.

The present disclosure provides, in another aspect, an exhaust gas treatment system for an internal combustion engine. The system includes an exhaust gas pathway configured to receive exhaust gas from the internal combustion engine, a first injector configured to selectively introduce a first reductant into the exhaust gas pathway in response to a sensed temperature of the exhaust gas being within a predetermined temperature range, and a first treatment element positioned within the exhaust gas pathway downstream of the first injector. The first treatment element includes a selective catalytic reduction (SCR) layer, a porous filter substrate, and a precious metal catalyst layer. The system also includes a second injector configured to introduce a second reductant into the exhaust gas pathway downstream of the first treatment element and a second treatment element positioned within the exhaust gas pathway downstream of the second injector. The second treatment element includes a SCR element.

The present disclosure provides, in another aspect, an exhaust gas treatment system for an internal combustion engine with an exhaust gas pathway configured to receive exhaust gas from the internal combustion engine, a first injector configured to introduce a first reductant into the exhaust gas pathway, and a first treatment element positioned within the exhaust gas pathway downstream of the first injector. The first treatment element includes a selective catalytic reduction (SCR) layer, a porous filter substrate, and a precious metal catalyst layer coated on the porous filter substrate. The system further includes a second injector configured to introduce a second reductant into the exhaust gas pathway downstream of the first treatment element and a second treatment element positioned within the exhaust gas pathway downstream of the second injector. The second treatment element includes a SCR element. The porous filter substrate is configured to capture soot from the exhaust gas, and the precious metal catalyst layer is configured to exothermically react hydrocarbons from the exhaust gas to promote oxidation of the captured soot on the porous filter substrate through active regeneration.

Any of the above referenced aspects of the disclosure can be combined with any one or more of the above referenced aspects of the disclosure. Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
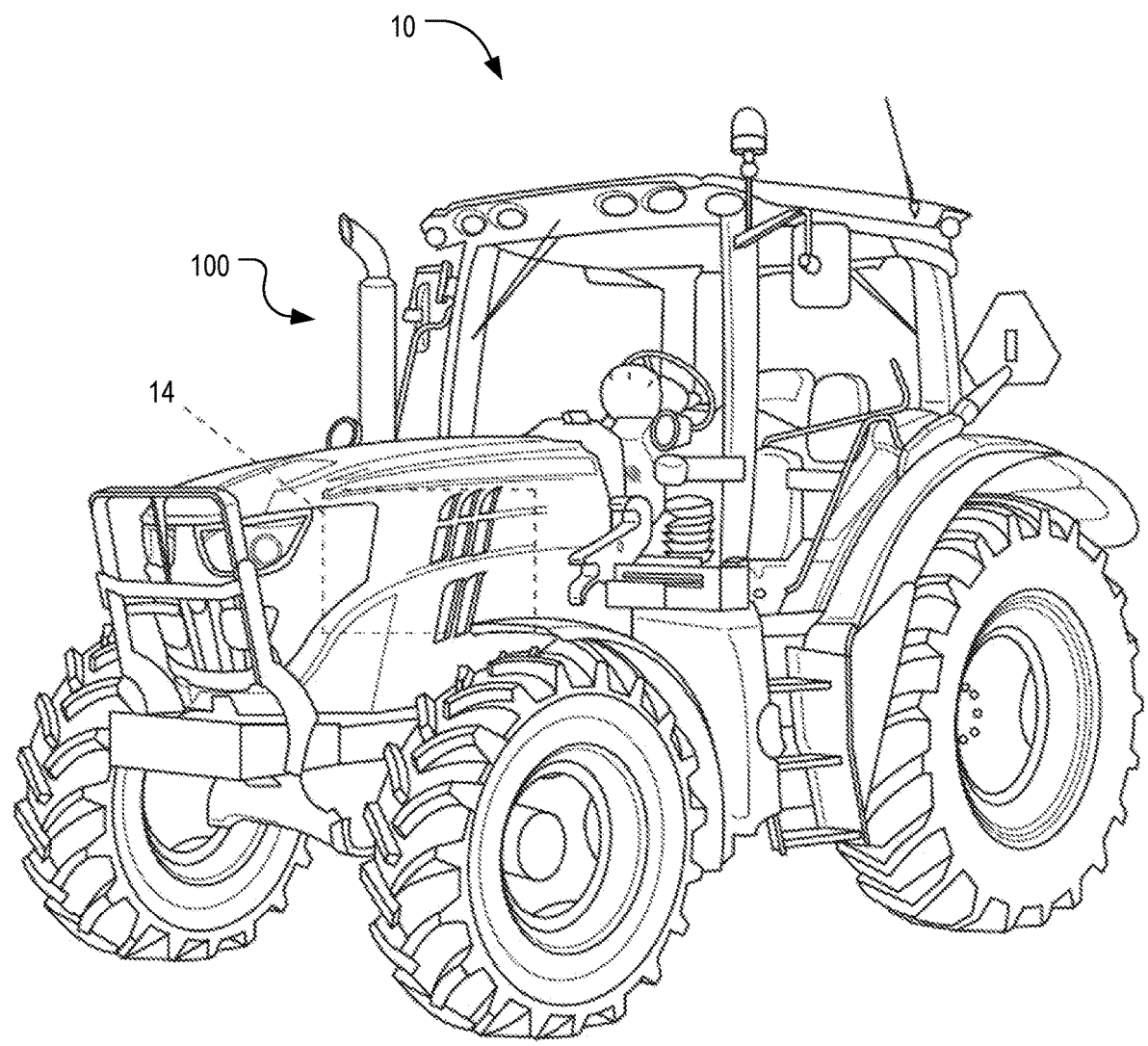
FIG. 1 is a perspective view of a vehicle in which the disclosed exhaust gas treatment system and method with improved regeneration may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
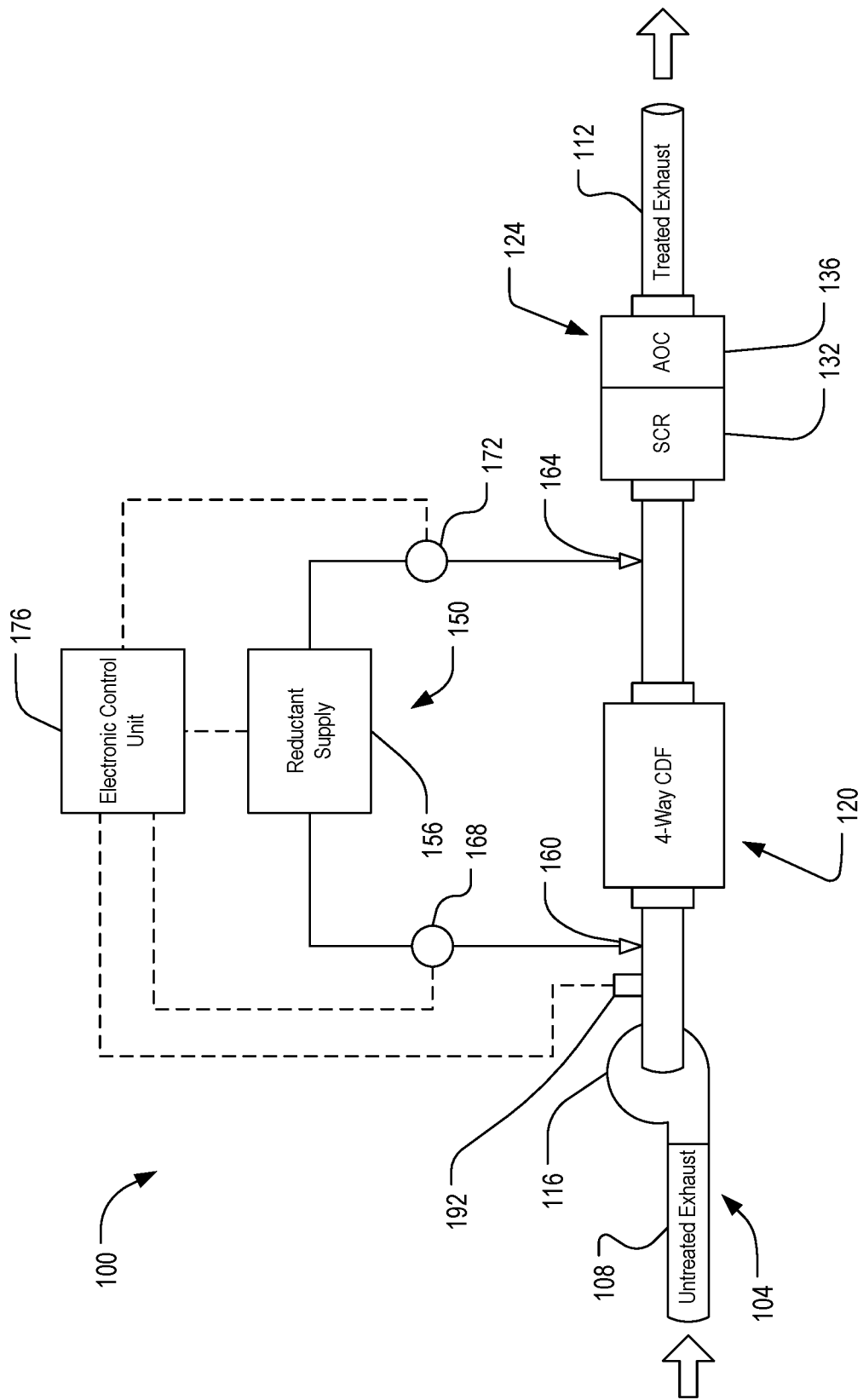
FIG. 2 is a schematic diagram of an exhaust gas treatment system according to an embodiment of the present disclosure.

With reference to FIG. 2, the exhaust gas treatment system 100 includes an exhaust pathway 104 (e.g., an exhaust pipe) having an inlet or upstream side 108 that receives untreated exhaust gas from the engine 14 and an outlet or downstream side 112 through which treated exhaust gas is discharged. A turbocharger 116 is disposed in the exhaust pathway 104 proximate the inlet 108, but in alternative embodiments, the turbocharger 116 may be omitted. In some embodiments, multiple turbochargers 116 may be provided in the exhaust pathway 104.

A first treatment element 120 and a second treatment element 124 are located in series along the exhaust pathway 104, between the inlet 108 and the outlet 112. Although the second treatment element 124 is located downstream of the first treatment element 120 in the illustrated embodiment, the numeric designations "first," "second," etc. are used herein for convenience and should not be regarded as defining order, quantity, or relative position. In addition, the illustrated first and second treatment elements 120, 124 are located downstream of the turbocharger 116. In other embodiments, however, the turbocharger 116 may be located between the first and second treatment elements 120, 124 or downstream of the treatment elements 120, 124.

Figure 3:
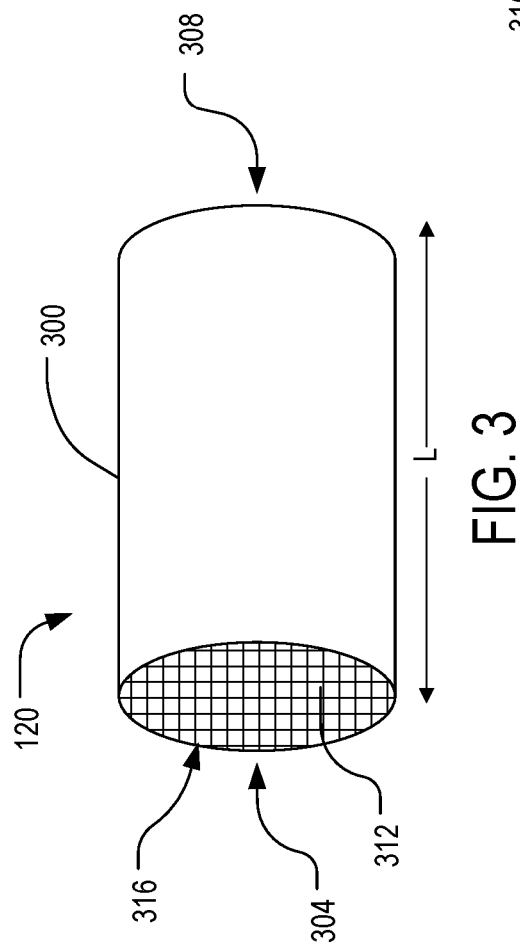
FIG. 3 is a perspective view of a four-way catalyzed diesel filter of the exhaust gas treatment system of FIG. 2.
Figure 4:
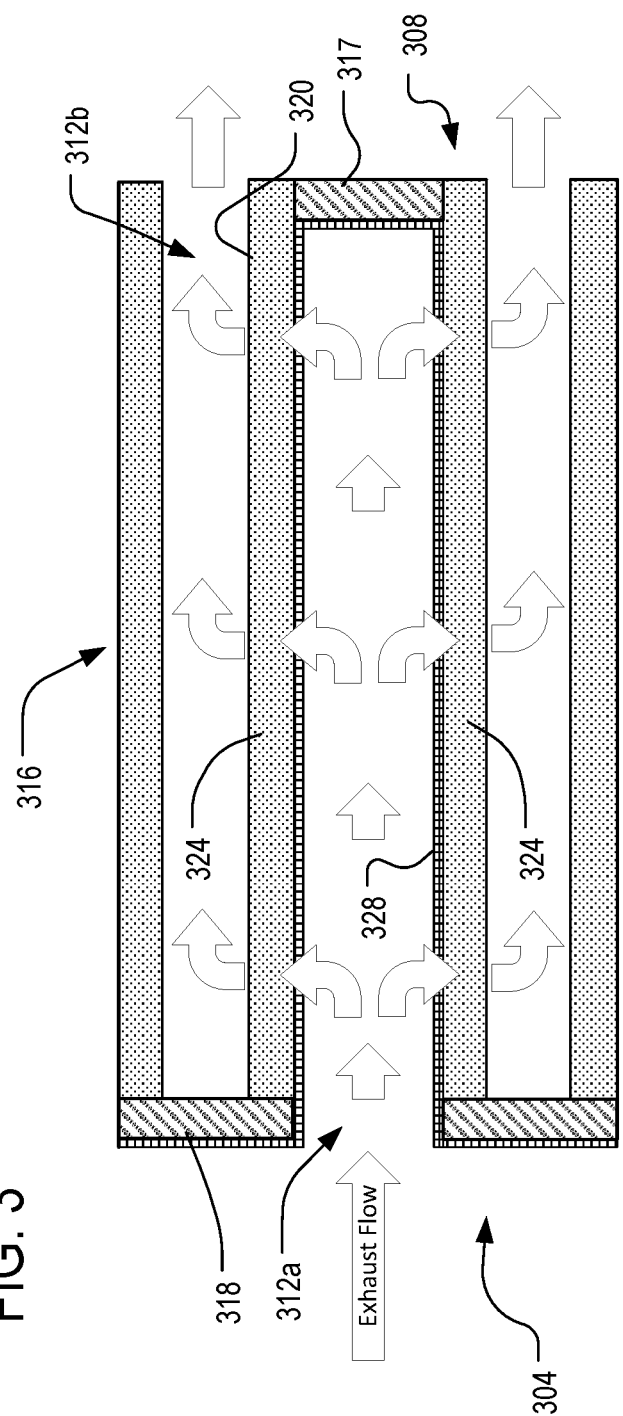
FIG. 4 is a cross-sectional view of a portion of the four-way catalyzed diesel filter of FIG. 3.

Referring to FIGS. 3 and 4, the first treatment element 120 in the illustrated embodiment is a four-way catalyzed diesel filter (CDF) that is close-coupled to the engine 14. The first treatment element 120 includes a cylindrical housing 300 with an inlet end 304, an outlet end 308 downstream of the inlet end 304, and a plurality of channels 312 extending between the inlet end 304 and the outlet end 308. The distance between the inlet end 304 and the outlet end 308 defines a length L of the first treatment element 120 (FIG. 3).

The channels 312 are arranged in a grid pattern or honeycomb pattern to form a filter substrate 316 of the first treatment element 120. In the illustrated embodiment, the filter substrate 316 is a monolithic element made of a highly heat-resistant material, such as ceramic. Adjacent channels 312 are blocked at alternating ends. That is, the inlet end 304 of a first channel 312a is open to receive incoming exhaust gas flowing along the exhaust gas pathway 104, and the outlet end 308 of the first channel 312a is blocked by an outlet end wall 317 (FIG. 4). The inlet end 304 of an adjacent second channel 312b is blocked by an inlet end wall 318, and the outlet end 308 of the second channel 312b is open to discharge exhaust gas from the first treatment element 120.

With reference to FIG. 4, a porous wall 320 extends between the inlet end 304 and the outlet end 308 and separates the adjacent channels 312a, 312b. Accordingly, exhaust gas that enters the inlet end 304 of the first channel 312a is forced through the porous wall 320 and into the second channel 312b before exiting the first treatment element 120. The porous wall 320 captures particulate matter from the exhaust gas. As such, the first treatment element 120 functions as a diesel particulate filter (DPF).

In the illustrated embodiment, the first treatment element 120 further includes a precious metal catalyst layer 324 and a selective catalytic reduction (SCR) layer 328. The precious metal catalyst layer 324 includes precious metal catalyst material (e.g., platinum, palladium, a combination of platinum and palladium, etc.) coated on each of the porous walls 320 of the filter substrate 316. The precious metal catalyst layer 324 includes a precious metal catalyst concentration or loading between about 5 grams and about 20 grams of the precious metal catalyst material per cubic foot of the filter substrate 316. In the illustrated embodiment, the precious metal catalyst concentration in the precious metal catalyst layer 324 is substantially uniform along the length L of the first treatment element 120. In other embodiments, the precious metal catalyst concentration in the precious metal catalyst layer 324 may vary along the length L of the first treatment element 120. The precious metal catalyst layer 324 may be applied to the walls 320 as a wash coat, via ion-exchange, or any other suitable process. In some embodiments, the precious metal catalyst layer 324 may fully infiltrate each of the walls 320. In other embodiments, the precious metal catalyst layer 324 may extend only partially through the thickness of each of the walls 320.

The precious metal catalyst layer 324 provides the first treatment element 120 with the functionality of a diesel oxidation catalyst (DOC). In particular, the precious metal catalyst layer 324 may oxidize carbon monoxide (CO) from exhaust passing through the first treatment element 120 into carbon dioxide ($CO_2$). The precious metal catalyst layer 324 may also exothermically oxidizes any hydrocarbons in the exhaust gas to carbon dioxide and water, which raises the temperature of the exhaust gas as it passes through first treatment element 120. Finally, the precious metal catalyst layer 324 may oxidize nitric oxide (NO) to nitrogen dioxide ($NO_2$).

With continued reference to FIG. 4, the SCR layer 328 lines each of the inlet channels 312a of the first treatment element 120 and provides the first treatment element 120 with NOx reduction capabilities. For example, the illustrated SCR layer 328 is coated on the inlet channel side of the porous walls 320 and on the inlet channel side of the outlet end wall 317. In the illustrated embodiment, the SCR layer 328 is also coated on the upstream side of each of the inlet end walls 318. The SCR layer 328 extends along at least 5% of the length L of the first treatment element 120, and the illustrated SCR layer 328 extends along substantially the entire length L of the first treatment element 120. In some embodiments, the SCR layer 328 may be impregnated into the pores of the porous walls 320, either partially or entirely through the thickness of each of the walls 320.

The SCR layer 328 includes SCR catalyst material, which may include one or more base metal oxides, such as $Al_2O_3$, $SiO_2$, $TiO_2$, $CeO_2$, $ZrO_2$, $V_2O_5$, $La_2O_3$. Alternatively or additionally, the SCR layer 328 may include one or more zeolites, such as Fe-zeolite, Cu-zeolite, blends of Fe-zeolite and Cu-zeolite, or Ce-zeolite. The SCR layer 328 includes an SCR catalyst concentration or loading between about 5 grams and about 100 grams of SCR catalyst material per liter of the filter substrate 316. In the illustrated embodiment, the SCR catalyst concentration in the SCR layer 328 is substantially uniform along the length L of the first treatment element 120. In other embodiments, the SCR catalyst concentration in the SCR layer 328 may vary along the length L of the first treatment element 120. The SCR layer 328 is preferably applied as a wash coat after the precious metal catalyst layer 324; however, the SCR layer 328 may be applied in other ways.

In some embodiments, the first treatment element 120 may also include a NOx storage layer (not shown) coated on to the substrate 316, either under or over the SCR layer 328. The NOx storage layer captures and stores NOx at temperatures within a first temperature range (e.g., between about 100 degrees Celsius and about 300 degrees Celsius in some embodiments, or between about 100 degrees Celsius and about 250 degrees Celsius in other embodiments). That is, the NOx storage layer captures and stores NOx at relatively low temperatures experienced during cold start or cold ambient operating conditions. The NOx storage layer releases the stored NOx at temperatures above the first temperature range, once the exhaust gas treatment system 100 has heated up.

In some embodiments, the NOx storage layer may include a passive NOx adsorber (PNA). In such embodiments, the NOx storage layer includes a zeolite, and preferably a small pore zeolite such as Chabazite or Linde Type A (LTA) that is thermally stable at temperatures up to at least 700 degrees Celsius. Palladium, platinum, or, in some embodiments, a mixture of precious metals, is dispersed on the zeolite. The precious metal can be dispersed on the zeolite by ion-exchange, adsorption, impregnation, or any other suitable method, such that precious metal ions are dispersed into the pores of the zeolite. The zeolite acts a molecular sieve such that only small molecules such as $NH_3$, NO, and $NO_2$ able to enter freely into the molecular structure of the zeolite. The precious metal ions dispersed in the zeolite store NOx and $NH_3$ by adsorption.

In other embodiments, the NOx storage layer may include a NOx storage catalyst. In such embodiments, the NOx storage layer includes a precious metal catalyst (e.g., platinum or palladium) coated on a base metal oxide, such as barium-aluminum oxide. The precious metal catalyst is configured to oxidize nitric oxide (NO) to nitrogen dioxide ($NO_2$), which then forms nitrates with the base metal oxide to effectively capture and store NOx.

The NOx storage layer allows for improved low temperature NOx reduction by capturing and storing NOx at low temperatures when the NOx reduction efficiency of the SCR layer 328 is reduced. When the stored NOx is later released at higher temperatures, the additional NOx may enhance passive regeneration of the filter substrate 316 before being reduced by the SCR layer 328.

Figure 5:
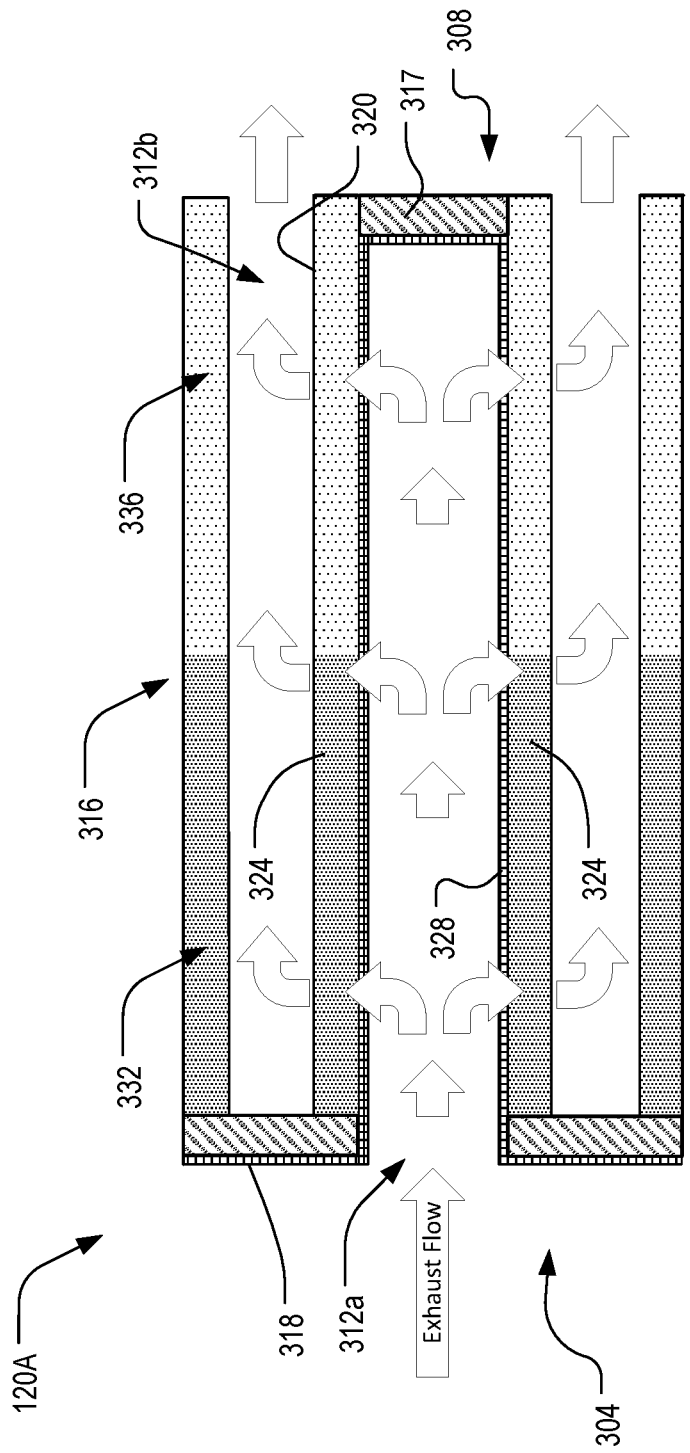
FIG. 5 is a cross-sectional view of a portion of a four-way catalyzed diesel filter according to another embodiment.
Figure 6:
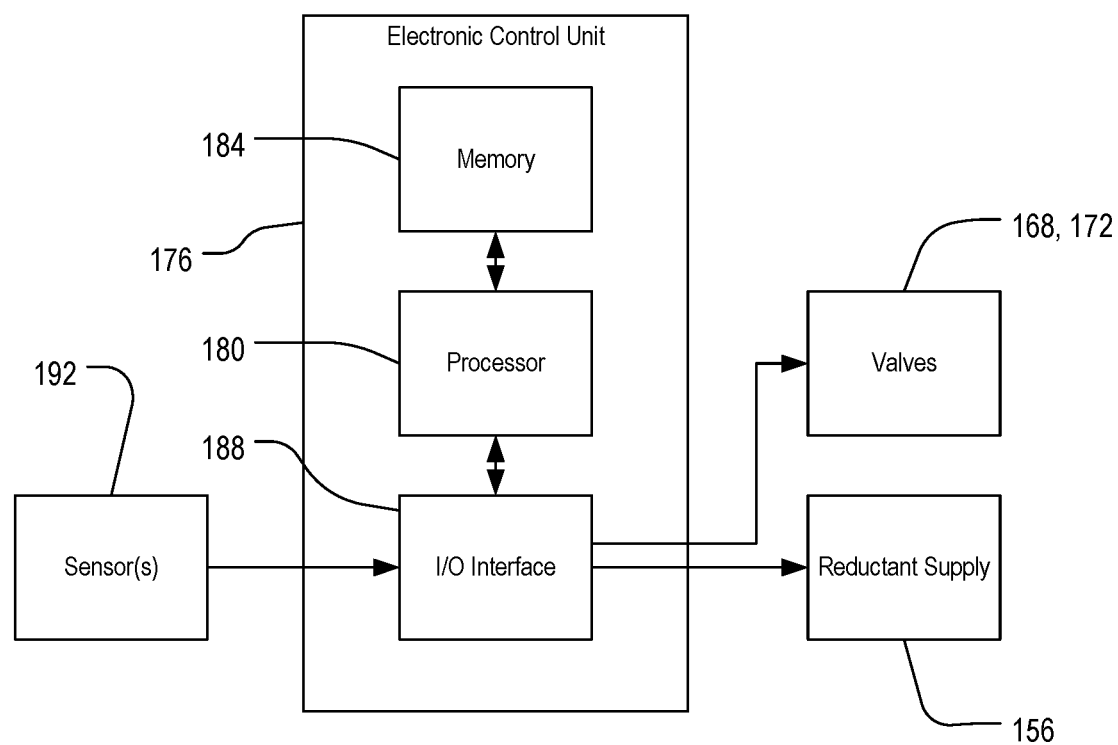
FIG. 6 is a schematic diagram of an electronic control unit of the exhaust gas treatment system of FIG. 2.

FIG. 5 illustrates a first treatment element 120A according to another embodiment. The first treatment element 120A is similar to the first treatment element 120 and may be incorporated into the exhaust gas treatment system 100 of FIG. 2. Features of the first treatment element 120A corresponding with features of the first treatment element 120 are given corresponding reference numbers. In addition, the following description focuses primarily on the differences between the first treatment element 120A and the first treatment element 120.

The filter substrate 316 of the first treatment element 120A includes a first or upstream portion 332 and a second or downstream portion 336. The concentration of precious metal catalyst material in the precious metal catalyst layer 324 differs in the first portion 332 and the second portion 336. For example, in the illustrated embodiment, precious metal catalyst layer 324 has a precious metal catalyst concentration in the first portion 332 between about 6 grams and about 40 grams of the precious metal catalyst material per cubic foot of the filter substrate 316. The precious metal catalyst layer 324 has a precious metal catalyst concentration in the second portion 336 between about 5 grams and about 20 grams of the precious metal catalyst material per cubic foot of the filter substrate 316. Thus, the precious metal catalyst concentration in the first portion 332 may be at least about 1.2 times greater than the precious metal catalyst concentration in the second portion 336. The precious metal catalyst material may include, for example, platinum or palladium. In some embodiments, the precious metal catalyst material may include a mixture of platinum and palladium. In such embodiments, the ratio of platinum to palladium in the first portion 332 may be the same or different as the ratio of platinum to palladium in the second portion 336.

In some embodiments, the lengths of the first and second portions 332, 336 are equal. For example, each of the first portion 332 and the second portion 336 may extend about 50% of the total length L of the first treatment element 120A. In other embodiments, the first portion 332 extends between about 5% and about 50% of the length L of the first treatment element 120A, and the second portion 336 extends between about 50% and about 95% of the length L of the first treatment element 120A. In other embodiments, the first portion 332 extends between about 5% and about 25% of the length L of the first treatment element 120A, and the second portion 336 extends between about 75% and about 95% of the length L of the first treatment element 120A. By including a higher concentration of precious metal catalyst material in the first portion 332, catalytic heating (e.g., due to oxidation of hydrocarbons in the exhaust gas) is increased, which enhances the NOx reduction performance of the SCR layer 328.

With reference to FIG. 2, the second treatment element 124 in the illustrated embodiment includes an SCR element 132 and an ammonia oxidation catalyst (AOC) 136. The SCR element 132 includes a catalytic washcoat on a monolithic support material, such as ceramic. The washcoat includes one or more metal catalysts, such as a copper-based catalyst, an iron-based catalyst, or a vanadium-based catalyst. Alternatively, other washcoats (e.g., zeolite-based) may be used.

The SCR element 132 and the AOC 136 are positioned in series, with the AOC 136 located downstream of the SCR element 132. The SCR element 132 reduces NOx from exhaust gas passing through it. The AOC 136 converts excess ammonia leaving the SCR element 132 to nitrogen and water. The SCR element 132 and the AOC 136 are packaged together within a common housing, as illustrated in FIG. 2. In some embodiments, the AOC 136 may be provided as a separate treatment element positioned downstream of the second treatment element 128. In other embodiments, either or both the SCR element 132 and the AOC 136 may be omitted and optionally replaced by other exhaust treatment elements.

With continued reference to FIG. 2, the exhaust gas treatment system 100 further includes a reductant system 150 with a reductant supply 156 configured to supply reductant into the exhaust gas pathway 104. The reductant supply 156 includes a reservoir for storing a reductant, such as diesel exhaust fluid (DEF) or ammonia. In some embodiments, the reductant supply 156 may include an ammonia generator configured to convert DEF into ammonia.

The reductant system 150 includes a first injector 160 and a second injector 164 in fluid communication with the reductant supply 156. In some embodiments, the first injector 160 and the second injector 164 receive the same type of reductant from the reductant supply 156. In other embodiments, two different types of reductant (e.g., ammonia gas and DEF) may be provided to the first injector 160 and the second injector 164, respectively.

The first injector 160 and the second injector 164 may be directly fluidly coupled to the reductant supply 156 (e.g., by independent conduits), or the first injector 160 and the second injector 164 may be fluidly coupled to a branch line, manifold, or other fluid transfer structure. The first injector 160 is positioned to introduce reductant into the exhaust pathway 104 at a first location upstream of the first treatment element 120 (i.e. between the turbocharger 116 and the first treatment element 120). The second injector 164 is positioned to introduce reductant into the exhaust pathway 104 at a second location downstream of the first treatment element 120 and upstream of the second treatment element 124 (i.e. between the first and second treatment elements 120, 124). The exhaust gas treatment system 100 may include one or more flow affecting features (not shown) to promote mixing of the reductant in the exhaust gas upstream of either or both the first treatment element 120 and the second treatment element 124.

A first valve 168 is disposed between the reductant supply 156 and the first injector 160, and a second valve 172 is disposed between the reductant supply 156 and the second injector 164. In some embodiments, the first and second valves 168, 172 can be incorporated into the respective injectors 160, 164 or into the reductant supply 156. Alternatively, each of the valves 168, 172 may be replaced by a pump.

Each of the illustrated valves 168, 172 is movable between a closed position in which the flow of reductant through the valve 168, 172 is substantially inhibited, and an open position in which reductant can flow freely through the valve 168, 172 (e.g., via solenoid actuators, pneumatic actuators, hydraulic actuators, or the like). In some embodiments, one or both of the valves 168, 172 can also have at least one intermediate position, between the closed and open positions, in which the flow of reductant through the valve 168, 172 is partially restricted. In some embodiments, one or both of the valves 168, 172 can be modulated to vary the flow rate of reductant.

The exhaust gas treatment system 100 further includes an electronic control unit or ECU 176 that controls operation of the system 100. Referring to FIG. 3, the ECU 176 includes a plurality of electrical and electronic components that provide power, operational control, and protection to the components and modules within the ECU 176. In particular, the ECU 176 includes, among other things, an electronic processor 180 (e.g., a programmable microprocessor, microcontroller, or similar device), non-transitory, machine-readable memory 184, and an input/output interface 188. The electronic processor 180 is communicatively coupled to the memory 184 and configured to retrieve from memory 184 and execute, among other things, instructions related to the control processes and methods described herein. In other embodiments, the ECU 176 includes additional, fewer, or different components.

In the illustrated embodiment, the ECU 176 is communicatively coupled to the first valve 168, the second valve 172, and, in some embodiments, the reductant supply 156 (i.e. via the input/output interface 188). The ECU 176 may also be configured to communicate with external systems including, for example, engine controls and/or operator controls.

The illustrated ECU 176 is communicatively coupled to a temperature sensor 192, which in the illustrated embodiment is coupled to the exhaust pathway 104 at a location upstream of the first treatment element 120 (FIG. 2). The temperature sensor 192 may be a thermistor, thermocouple, resistance temperature detector, infrared sensor, or any other sensor suitable for measuring the temperature of exhaust gas. All or a portion of the temperature sensor 192 may extend into the exhaust pathway 104 so as to be directly exposed to exhaust gas. Alternatively, the temperature sensor 192 may be located outside the exhaust pathway 104 and measure the temperature of the exhaust gas indirectly (e.g., by measuring the temperature of the exhaust pipe).

The sensor 192 provides a temperature signal (e.g., an electrical signal) to the ECU 176 associated with the temperature of the exhaust gas flowing through the exhaust gas pathway 104 at the position of the temperature sensor 192. In the illustrated embodiment, the temperature signal is associated with the temperature of the exhaust gas entering the first treatment element 120.

In operation, the ECU 176 periodically or continuously receives the temperature signal from the sensor 192 (e.g., via the input/output interface 188), which is indicative of the temperature of the exhaust gas entering the first treatment element 120. The ECU 176 uses the temperature signal to determine a sensed temperature of the exhaust gas. The ECU 176 then periodically or continuously compares the sensed temperature with a temperature range. In some embodiments, the temperature range is about 50 degrees Celsius to about 400 degrees Celsius in some embodiments, about 100 degrees Celsius to about 300 degrees Celsius in other embodiments, or about 150 degrees Celsius to about 300 degrees Celsius in other embodiments. The temperature range corresponds with a cold-start or cold-operating temperature range of the exhaust gas treatment system 100. The temperature range may be predetermined and stored in memory 184 (FIG. 3), or the temperature range may be calculated and periodically or continuously modified by the ECU 176 in response to feedback from one or more additional sensors.

If the sensed temperature is within the temperature range, the ECU 176 sets the first injector 160 to dose reductant into the exhaust gas pathway 104 by opening the first valve 168 (FIG. 2). The reductant mixes with the exhaust gas and enters the first treatment element 120. The SCR layer 328 converts NOx in the presence of ammonia from the reducing agent via the reaction of Equation (1). In embodiments of the first treatment element 120 that include a NOx storage layer, the NOx storage layer extracts and store NOx from the passing exhaust gas at the relatively low temperatures experienced within the cold-start temperature range. Because molecules of ammonia in the reductant are similar in size to NOx molecules, the ammonia can enter the pores of the NOx storage layer and react with stored NOx to form nitrogen and water. This regenerates the NOx storage layer and frees up molecular sites for additional NOx storage. The reaction is enhanced by the SCR layer 328, which is coated together with the NOx storage layer over the flow-through filter substrate 316 of the first treatment element 120.

The exhaust gas is then forced through the porous filter walls 320, which capture soot and particulate matter from the exhaust gas. The precious metal catalyst layer 324 oxidizes carbon monoxide (CO) from exhaust passing through the first treatment element 120 into carbon dioxide ($CO_2$). The precious metal catalyst layer 324 also exothermically oxidizes any hydrocarbons in the exhaust gas to carbon dioxide and water, which raises the temperature of the exhaust gas as it passes through first treatment element 120. Finally, the precious metal catalyst layer 324 oxidizes nitric oxide (NO) to nitrogen dioxide ($NO_2$) and also oxidizes any residual unreacted ammonia to reduce ammonia slip.

Next, the exhaust gas flows through the SCR portion 132 and the AOC portion 136 of the second treatment element 124. Because the second treatment element 124 is downstream of the first treatment element 120, it warms up more slowly than the close-coupled first treatment element 120. The first treatment element 120 is advantageously able to effectively reduce NOx during the cold-start temperature range, however, giving the second treatment element 124 time to warm up and increase its efficacy.

The ECU 176 continues to monitor the temperature sensor 192. When the exhaust gas treatment system 100 has warmed up sufficiently such that the sensed temperature exceeds the cold-start temperature range (e.g., the sensed temperature is greater than 300 degrees Celsius in some embodiments), the ECU 176 shuts off or disables flow through the first injector 160. For example, the ECU 176 may disable flow through the first injector 160 by closing the first valve 168. In some embodiments, a minimal amount of reductant may continue to flow through the first injector 160 to keep the injector 160 cool and to reduce sulfur poisoning effects on the SCR layer 328, particularly if the SCR layer 328 includes a copper base metal.

At elevated temperatures beyond the cold-start temperature range, ammonia may oxidize in the presence of the precious metal catalyst layer 324 in the first treatment element 120. This may produce additional NOx, rather than reducing the NOx content of the exhaust gas as desired. The exhaust gas treatment system 100 avoids this reaction by stopping injection through the first injector 160 at temperatures above the cold-start temperature range. NOx reduction responsibility is then borne by the second treatment element 124, which is now sufficiently warmed for effective NOx reduction.

When the second treatment element 124 is sufficiently warmed (e.g., as indicated by a temperature sensor proximate the second treatment element 124, via software estimation based on other sensed temperatures, etc.), the ECU 176 sets the second injector 164 to dose reductant from the reductant supply 156 into the exhaust gas pathway 104. For example, the ECU 176 may open the second valve 172 (FIG. 2) if the sensed temperature at the second treatment element 124 is greater than 200 degrees Celsius. The reductant includes ammonia, which reduces NOx in the SCR element 132 via the reaction of Equation (1). Any unreacted ammonia is subsequently oxidized in the AOC portion 136. The treated exhaust then exits the exhaust gas treatment system 100 through the outlet 112.

If the sensed temperature of the exhaust gas at the second treatment element 124 falls below the threshold temperature (e.g., about 200 degrees Celsius), the ECU 176 stops flow through the second injector 164 by closing the second valve 172. This avoids the formation of urea deposits, which may occur at low temperatures. In some embodiments, a minimal amount of reductant may continue to flow through the second injector 164 to keep the injector 164 cool. In some embodiments, the ECU 176 may modulate flow of reductant through the second injector 164 to account for different levels of NOx in the exhaust gas (e.g., in response to feedback from a NOx concentration sensor; not shown).

The first treatment element 120 promotes passive regeneration of the filter substrate 316 at ordinary operating temperatures. Because the first treatment element 120 contains precious metal catalyst material in the precious metal catalyst layer 324, it performs the functions of a diesel oxidation catalyst (DOC). In particular, the precious metal catalyst material in the first treatment element 120 promotes oxidation of NO to $NO_2$, thereby increasing a proportion of $NO_2$ in the exhaust gas. As evident from Equations (2) and (3), the higher proportion of $NO_2$ contributes to soot oxidation.

The ECU 176 may periodically initiate active regeneration cycles by dosing the exhaust gas with hydrocarbons (e.g., unburnt fuel) either in the cylinders of the engine 14 or between the engine 14 and the first treatment element 120. The hydrocarbons in the exhaust gas that pass through the first treatment element 120 react with the precious metal catalyst material in the precious metal catalyst layer 324 and oxidize in an exothermic reaction. This can raise the temperature of the exhaust gas to temperatures of at least 500 degrees Celsius to oxidize soot trapped in the porous filter walls 320 via Equations (4) and (5).

In some embodiments, the ECU 176 may also periodically initiate desulfuring (deSOx) regeneration cycles by dosing the exhaust gas with hydrocarbons and initiating reductant injection through the first injector 160. In the presence of ammonia, sulfur contamination that may build up in the first treatment element 120 is oxidized at lower temperatures (e.g., between 400-500 degrees Celsius) than without ammonia present (requiring temperatures between about 500-650 degrees Celsius).

Thus, the close-coupled first treatment element 120 combines the functionality of a DOC, a DPF, and an SCR element into a single treatment element. The first treatment element 120 provides the exhaust gas treatment system 100 with improved cold-start NOx reduction, along with other benefits including improved active and passive regeneration and desulfuring performance. Because these capabilities are combined in a single treatment element, the overall size, weight, thermal mass, and cost of the exhaust gas treatment system 100 can be reduced.

Various features of the disclosure are set forth in the following claims.

What is claimed is:

1. An exhaust gas treatment system for an internal combustion engine, the exhaust gas treatment system comprising:
    an exhaust gas pathway configured to receive exhaust gas from the internal combustion engine;
    a first treatment element positioned within the exhaust gas pathway, the first treatment element including
        an inlet channel including a selective catalytic reduction (SCR) washcoat and a NOx storage layer coated under or over the SCR washcoat,
        an outlet channel, and
        a porous filter wall separating the inlet channel and the outlet channel such that the exhaust gas is configured to flow from the inlet channel to the outlet channel through the porous filter wall, wherein the porous filter wall includes an inlet side facing the inlet channel, an outlet side facing the outlet channel, and a precious metal catalyst layer fully infiltrating a thickness of the porous filter wall between the inlet side and the outlet side,
    a first injector configured to introduce a first reductant into the exhaust gas pathway upstream of the first treatment element;
    a second injector configured to introduce a second reductant into the exhaust gas pathway downstream of the first treatment element;
    a second treatment element positioned within the exhaust gas pathway downstream of the second injector, the second treatment element including a SCR element; and
    a controller configured to control a flow of the first reductant through the first injector based on a temperature of the exhaust gas proximate the first treatment element, and to control a flow of the second reductant through the second injector based on a temperature of the exhaust gas proximate the second treatment element,
    wherein the controller is configured to reduce the flow of the first reductant when the temperature of the exhaust gas proximate the first treatment element exceeds a first threshold temperature,
    wherein the controller is configured to increase the flow of the second reductant when the temperature of the exhaust gas proximate the second treatment element exceeds a second threshold temperature, and
    wherein the NOx storage layer configured to capture and store NOx at temperatures within a first temperature range and to release stored NOx at temperatures greater than the first temperature range, and
    wherein the controller is configured to periodically initiate a desulfuring regeneration cycle by increasing a concentration of hydrocarbons in the exhaust gas and increasing the flow of the first reductant through the first injector to oxidize sulfur contamination in the first treatment element at temperatures between 400 and 500 degrees Celsius.

2. The exhaust gas treatment system of claim 1, wherein:
    the first treatment element includes an inlet end and an outlet end opposite the inlet end,
    the inlet channel extends from the inlet end toward the outlet end,
    the outlet channel extends from the outlet end toward the inlet end, and
    a distance between the outlet end and the inlet end defines a length of the first treatment element.

3. The exhaust gas treatment system of claim 2, wherein the precious metal catalyst layer includes a substantially uniform concentration of precious metal along the length of the first treatment element.

4. The exhaust gas treatment system of claim 2, wherein a concentration of precious metal in the precious metal catalyst layer varies along the length of the first treatment element.

5. The exhaust gas treatment system of claim 4, wherein:
    the precious metal catalyst layer includes a first concentration of precious metal along a first portion of the length,
    the precious metal catalyst layer includes a second concentration of precious metal along a second portion of the length, and
    the first concentration is at least 20% greater than the second concentration.

6. The exhaust gas treatment system of claim 5, wherein:
    the inlet channel, the outlet channel, and the porous filter wall are integrally formed together as part of a monolithic filter substrate,
    the first concentration is between 6 grams of precious metal per cubic foot of filter substrate and 40 grams of precious metal per cubic foot of filter substrate, and
    the second concentration is between 5 grams of precious metal per cubic foot of filter substrate and 20 grams of the precious metal per cubic foot of filter substrate.

7. The exhaust gas treatment system of claim 2, wherein the SCR washcoat extends along at least 5% of the length of the first treatment element, and wherein the SCR washcoat is at least partially impregnated into the porous filter wall.

8. The exhaust gas treatment system of claim 7, wherein the SCR washcoat extends along at least 50% of the length of the first treatment element.

9. The exhaust gas treatment system of claim 1, wherein the first threshold temperature is about 300 degrees Celsius, and wherein the second threshold temperature is about 200 degrees Celsius.

10. An exhaust gas treatment system for an internal combustion engine, the exhaust gas treatment system comprising:
    an exhaust gas pathway configured to receive exhaust gas from the internal combustion engine;
    a first injector configured to selectively introduce a first reductant into the exhaust gas pathway in response to a sensed temperature of the exhaust gas being within a predetermined temperature range;
    a first treatment element positioned within the exhaust gas pathway downstream of the first injector, the first treatment element including
        a selective catalytic reduction (SCR) layer, a porous filter substrate,
a precious metal catalyst layer, and
a NOx storage layer including a passive NOx adsorber (PNA) configured to capture and store NOx at temperatures within a first temperature range and to release stored NOx at temperatures greater than the first temperature range, wherein the NOx storage layer and the SCR layer are coated together over the porous filter substrate;
a second injector configured to introduce a second reductant into the exhaust gas pathway downstream of the first treatment element;
a second treatment element positioned within the exhaust gas pathway downstream of the second injector, the second treatment element including a SCR element; and
a controller configured to periodically initiate a desulfuring regeneration cycle by increasing a concentration of hydrocarbons in the exhaust gas and increasing the flow of the first reductant through the first injector to oxidize sulfur contamination in the first treatment element at temperatures between 400 and 500 degrees Celsius.

11. The exhaust gas treatment system of claim 10, wherein:
the precious metal catalyst layer is coated on the porous filter substrate,
the porous filter substrate is configured to capture soot from the exhaust gas,
the precious metal catalyst layer is configured to oxidize carbon monoxide (CO) to carbon dioxide ($CO_2$), and
the precious metal catalyst layer is configured to oxidize nitric oxide (NO) to nitrogen dioxide ($NO_2$) to promote oxidation of the captured soot on the porous filter substrate through passive regeneration.

12. The exhaust gas treatment system of claim 11, wherein the precious metal catalyst layer is configured to exothermically react hydrocarbons from the exhaust gas to promote oxidation of the captured soot on the porous filter substrate through active regeneration.

13. The exhaust gas treatment system of claim 10, wherein:
the first treatment element includes an inlet end and an outlet end opposite the inlet end,
a distance between the outlet end and the inlet end defines a length of the first treatment element,
the precious metal catalyst layer includes a first concentration of precious metal along a first portion of the length,
the precious metal catalyst layer includes a second concentration of precious metal along a second portion of the length, and
the first concentration is at least 20% greater than the second concentration.

14. An exhaust gas treatment system for an internal combustion engine, the exhaust gas treatment system comprising:
an exhaust gas pathway configured to receive exhaust gas from the internal combustion engine;
a first injector configured to introduce a first reductant into the exhaust gas pathway;
a first treatment element positioned within the exhaust gas pathway downstream of the first injector, the first treatment element including
an inlet channel,
an outlet channel,
a selective catalytic reduction (SCR) layer,
a NOx storage layer coated under or over the SCR layer,
a porous filter substrate including a porous filter wall separating the inlet channel and the outlet channel such that the exhaust gas is configured to flow from the inlet channel to the outlet channel through the porous filter wall, and
a precious metal catalyst layer coated on the porous filter substrate such that the precious metal catalyst layer fully infiltrates the porous filter wall;
a second injector configured to introduce a second reductant into the exhaust gas pathway downstream of the first treatment element;
a second treatment element positioned within the exhaust gas pathway downstream of the second injector, the second treatment element including a SCR element; and
a controller configured to periodically initiate a desulfuring regeneration cycle by increasing a concentration of hydrocarbons in the exhaust gas and increasing the flow of the first reductant through the first injector to oxidize sulfur contamination in the first treatment element at temperatures between 400 and 500 degrees Celsius,
wherein the porous filter substrate is configured to capture soot from the exhaust gas, and
wherein the precious metal catalyst layer is configured to exothermically react hydrocarbons from the exhaust gas to promote oxidation of the captured soot on the porous filter substrate through active regeneration.

15. The exhaust gas treatment system of claim 14, wherein the precious metal catalyst layer is configured to oxidize carbon monoxide (CO) to carbon dioxide ($CO_2$), and wherein the precious metal catalyst layer is configured to oxidize nitric oxide (NO) to nitrogen dioxide ($NO_2$) to promote oxidation of the captured soot on the porous filter substrate through passive regeneration.

16. The exhaust gas treatment system of claim 14, wherein the SCR layer is located in the inlet channel, and wherein the NOx storage layer includes a passive NOx adsorber (PNA) configured to capture and store NOx at temperatures within a first temperature range and to release stored NOx at temperatures greater than the first temperature range.

17. The exhaust gas treatment system of claim 16, wherein:
the first treatment element includes an inlet end and an outlet end opposite the inlet end,
the inlet channel extends from the inlet end toward the outlet end,
the outlet channel extends from the outlet end toward the inlet end, and
a distance between the outlet end and the inlet end defines a length of the first treatment element.

18. The exhaust gas treatment system of claim 17, wherein:
the precious metal catalyst layer includes a first concentration of precious metal along a first portion of the length,
the precious metal catalyst layer includes a second concentration of precious metal along a second portion of the length, and
the first concentration is at least 20% greater than the second concentration.

19. The exhaust gas treatment system of claim 14, wherein the controller is configured to control a flow of the first reductant through the first injector based on a temperature of the exhaust gas proximate the first treatment element, and to control a flow of the second reductant through the second injector based on a temperature of the exhaust gas proximate the second treatment element,
  wherein the controller is configured to reduce the flow of the first reductant when the temperature of the exhaust gas proximate the first treatment element exceeds a first threshold temperature,
  wherein the controller is configured to increase the flow of the second reductant when the temperature of the exhaust gas proximate the second treatment element exceeds a second threshold temperature, and
  wherein the first threshold temperature is different than the second threshold temperature.

\* \* \* \* \*